(12) United States Patent
Sato et al.

(10) Patent No.: US 6,399,906 B1
(45) Date of Patent: Jun. 4, 2002

(54) SWITCH FOR A CARD CONNECTOR

(75) Inventors: Shigeru Sato, Chiba; Noriaki Furuta, Otsu, both of (JP)

(73) Assignees: Yamaichi Electronics Co., Ltd., Tokyo; Matsushita Electric Industrial Co., Ltd., Osaka, both of (JP)

( * ) Notice: Subject to any disclaimer, the term of this patent is extended or adjusted under 35 U.S.C. 154(b) by 53 days.

(21) Appl. No.: 09/703,676

(22) Filed: Nov. 2, 2000

(30) Foreign Application Priority Data

Nov. 5, 1999 (JP) .......................................... 11-316107

(51) Int. Cl.[7] ................................................ H01H 3/16
(52) U.S. Cl. ...................... 200/61.59; 200/47; 439/188; 439/489
(58) Field of Search ............................... 200/47, 61.59, 200/246, 283; 439/188, 489, 630

(56) References Cited

U.S. PATENT DOCUMENTS

| | | | | |
|---|---|---|---|---|
| 3,283,107 A | * | 11/1966 | Anson ..................... 200/246 X |
| 6,039,599 A | * | 3/2000 | Benjamin et al. ............ 439/489 |
| 6,059,592 A | * | 5/2000 | Inadama ...................... 439/188 |
| 6,073,853 A | * | 6/2000 | Odic ....................... 439/188 X |
| 6,129,571 A | * | 10/2000 | Ikemoto ................. 439/630 X |

* cited by examiner

*Primary Examiner*—Renee Luebke
(74) *Attorney, Agent, or Firm*—Finnegan, Henderson, Farabow, Garrett & Dunner, L.L.P.

(57) ABSTRACT

A switch structure for a card connector comprises: a first cantilevered contact spring 20 urged so that a front engagement portion of the first contact spring engages a part of the recessed portion of the inserted card corresponding to one of two slide positions of a write protect button 3; and a second cantilevered contact spring 30 extending along and in the same direction as the first contact spring and urged so that a front engagement portion of the second contact spring engages a part of the recessed portion of the inserted card corresponding to the other slide position of the write protect button 3; wherein the slide position of the write protect button is detected based on whether the first and second contact springs are in or out of contact with each other, thereby determining the position of the write protect button accurately and reliably.

5 Claims, 10 Drawing Sheets

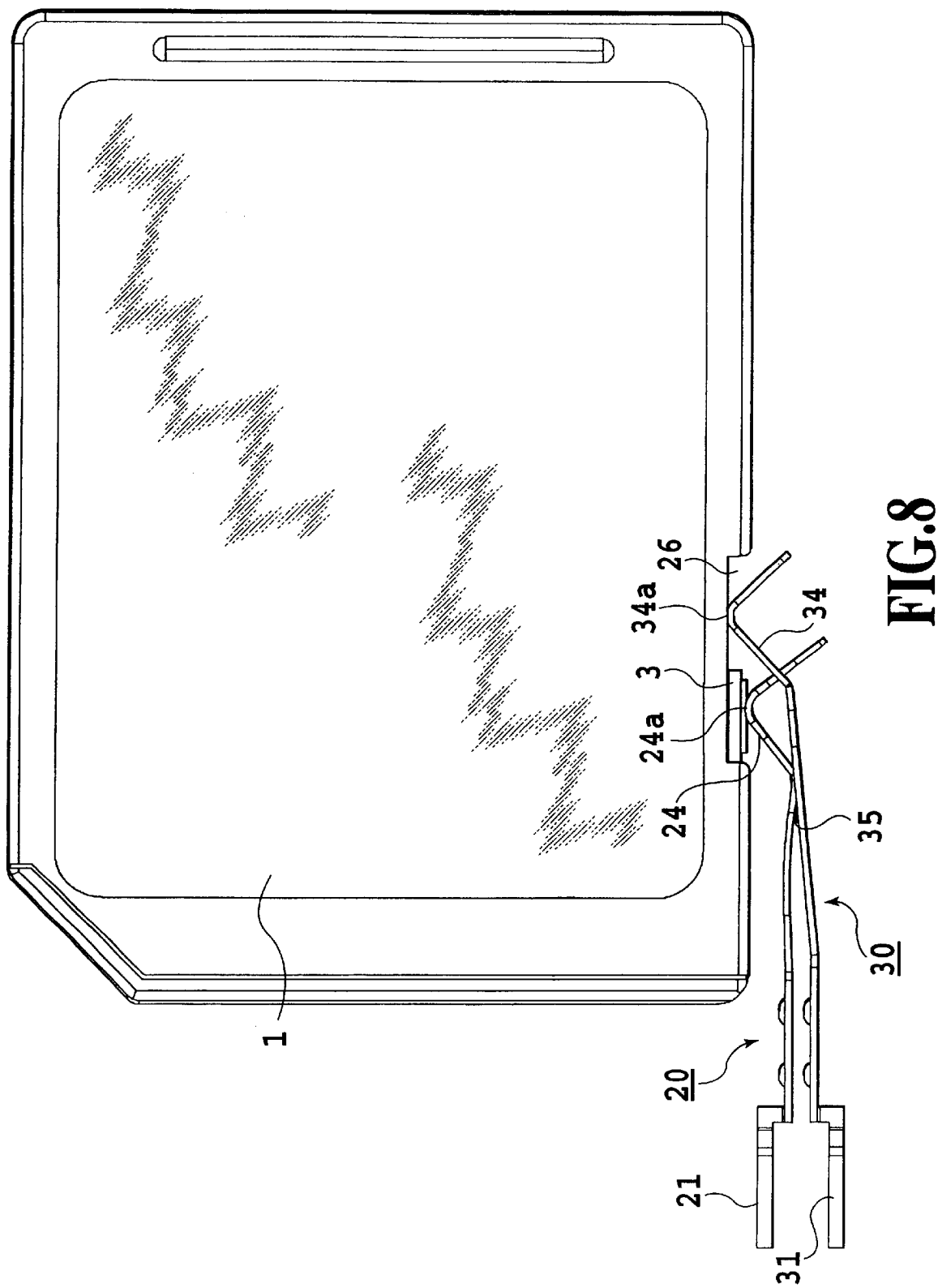

SWITCH-ON

SWITCH-OFF

SWITCH-OFF

SWITCH-ON

SWITCH-ON

SWITCH-OFF

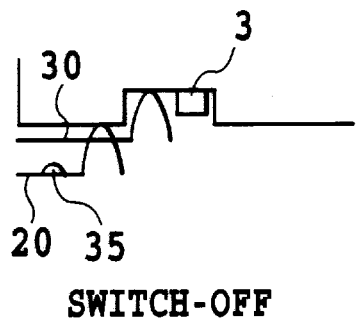
SWITCH-OFF
FIG.12A
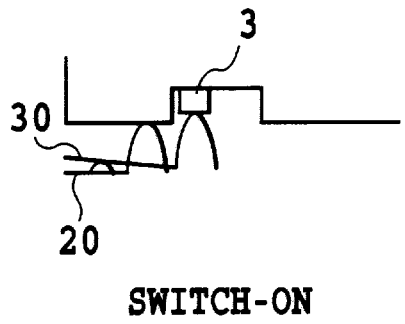
SWITCH-ON
FIG.12B
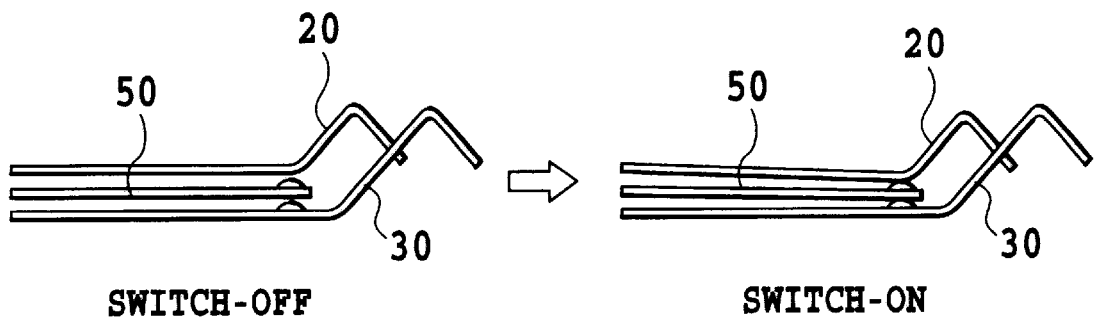
SWITCH-OFF
FIG.13A
SWITCH-ON
FIG.13B
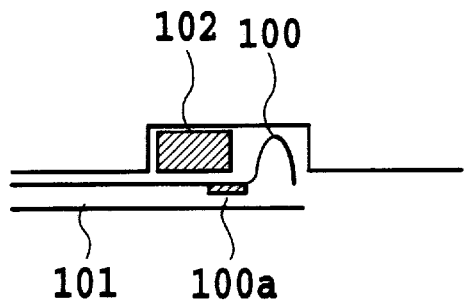
FIG.14A
PRIOR ART
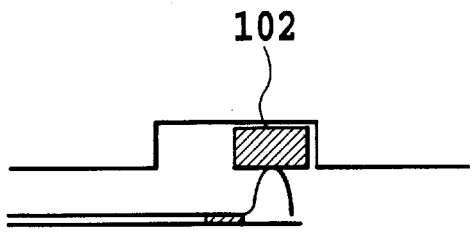
FIG.14B
PRIOR ART

SWITCH FOR A CARD CONNECTOR

This application is based on Patent Application No. 11-316107 (1999) filed Nov. 5, 1999, the content of which is incorporated hereinto by reference.

BACKGROUND OF THE INVENTION

1. Field of the Invention

The present invention relates to an IC card connector for electronic devices, such as cellular phones, telephones, PDAs (personal digital assistance), portable audio devices and cameras, and more specifically to a switch structure for detecting the position of a write-protect button of an IC card.

2. Description of the Related Art

Electronic devices, such as cellular phones, telephones, PDAs and digital cameras, accept IC cards incorporating a memory or control circuit, such as SIM (subscriber identity module) cards, MMCs (multimedia cards) and Smart Media (trade name), for a variety of expanded functions and for identification of the user.

The IC cards of this kind typically have some provisions for protecting information stored in the internal memory against being overwritten. They are also provided with a means of undoing the write protect function so that the user can write information into the card.

A variety of write protect methods have been proposed. Of these, a method using a write protect button that can be slid between two positions as in floppy disks is considered advantageous because of its capability of repetitive use and simple structure.

In this slide button method, a write protect button that can be slid between two positions is provided on the card side, and the electronic device accommodating the card has an electric circuit that protects the card from being written into when the button is situated at one position and, when it is at the other position, allows the card to be written into.

A sensor structure for detecting the position of the write protect button may include one using light. The optical method, however, has problems that a satisfactory detection accuracy cannot be expected as the card thickness and size become smaller and that the optical sensor may stand in the way for reducing the size and cost depending on where it is arranged.

FIG. 14A and FIG. 14B show a conventional construction of the write protect button position detector using a contact spring.

In this conventional construction, a switch structure consisting of a contact spring 100 with a contact portion 100a and a stationary contact strip 101 detects the presence or absence of the write protect button 102 that slides between two positions. In this switch structure, when the write protect button 102 is at one position, these contact elements 100, 101 are separated (FIG. 14A). When the write protect button 102 is at the other position, the contact elements 100, 101 are in contact (FIG. 14B).

In this switch structure, the displacement of the contact spring 100 depends basically on the height (thickness) of the button 102. Considering a play due to a difference between the width of a card accommodating portion of the connector and the width of the card, the amount of deflection of the contact spring 100 is the play subtracted from the thickness of the button 102. So, if the protect button is 0.6 mm high and the play is 0.3 mm, for example, the amount of deflection is 0.3 mm. Taking a parts tolerance and an assembly tolerance also into consideration in addition to the play, the deflection amount of the contact spring 100 may in the worst case be only about 0.1 mm.

In the above conventional switch structure, the two contact elements are made to contact each other by the displacement of only one contact element 100, so that the play and the assembly tolerance make it difficult to secure a sufficient relative displacement between the two contact elements, resulting in a poor contact between the contact elements 100 and 101 and giving rise to a problem of being unable to detect the protect button position correctly and stably.

The present invention has been accomplished under these circumstances to provide a switch structure of the card connector which can precisely and reliably detect the position of the write protect button by making sure that the contact elements can always perform reliable and stable contacting and parting actions even when various error factors occur.

SUMMARY OF THE INVENTION

In this invention, two cantilevered contact springs are used. The first contact spring is urged so that its engagement portion engages the recessed portion of the inserted card corresponding to one of the two slide positions of the write protect button and the second contact spring is urged so that its engagement portion engages the recessed portion of the inserted card corresponding to the other slide position of the write protect button.

Thus, in the switch structure of this invention, at whichever of the two slide positions the write protect button is set, the engagement portion of one contact spring engages the write protect button and the engagement portion of the other contact spring engages the recessed portion adjacent to the write protect button. Hence, even if there are plays and dimensional tolerances, these contact springs can always be displaced by an amount equal to the height of the write protect button whenever the write protect button is switched in position.

Further in the switch structure of this invention, because the two contact springs are brought into or out of contact with each other by using the raised portion corresponding to the write protect button and the recessed portion adjacent to the raised portion, the displacement directions of the two contact springs are opposite. That is, when the two contact springs are displaced toward each other, they contact; and when they are displaced away from each other, they disengage.

Therefore, in this invention the two contact springs are brought into or out of contact with each other by the relative displacement between them equal to two times the height of the write protect button. This enables a reliable contact and separation between the two contact springs even with small or ultra-small cards in which a sufficient button height cannot be secured.

This invention therefore allows the position of the write protect button to be detected accurately and reliably at all times, preventing an erroneous operation of writing data into a write-protected card.

In another embodiment of a card connector of this invention for removably holding a card having a write protect button, the write protect button having a predetermined height and being slidable between two positions in a recessed portion formed in an outer surface of the card; a switch structure comprising a first cantilevered contact spring urged so that an engagement portion of the first contact spring engages a part of the recessed portion of the inserted card corresponding to one slide position of the write protect button; and a second cantilevered contact spring extending along and in the same direction as the first contact spring and urged so that an engagement portion of the second contact spring engages an outer wall surface of the inserted card near the write protect button; wherein the slide position of the write protect button is detected based on displacements of the first and second contact springs toward or away from each other.

In this invention two cantilevered contact springs are used. The first contact spring is urged so that its engagement portion engages the recessed portion of the inserted card corresponding to one of the two slide positions of the write protect button and the second contact spring is urged so that its engagement portion engages the outer wall surface (e.g., card side wall) of the inserted card near the write protect button.

In the switch structure of this invention, at whichever of the two slide positions the write protect button is set, the engagement portion of the second contact spring always presses against the outer wall surface of the card near the write protect button, so that the second contact spring is positioned by the outer wall surface of the card taken as a reference. The first contact spring, on the other hand, is always displaced by an amount equal to the height of the write protect button according to the slide position of the button.

In this invention, because the two contact springs are brought into or out of contact with each other based on their positions on the card, if there are plays and dimensional tolerances, it is possible to always obtain a relative displacement between the two contact springs equal to the height of the write protect button.

The above and other objects, effects, features, and advantages of the present invention will become more apparent from the following description of embodiments thereof; taken in conjunction with the accompanying drawings.

BRIEF DESCRIPTION OF THE DRAWINGS

FIG. 8 is a plan view showing the switch structure of the card connector of this invention in the one embodiment when the contacts are in contact;

FIG. 12A and FIG. 12B are schematic views showing a switch structure of the card connector of this invention in a further embodiment;

FIG. 13A and FIG. 13B are schematic views showing a switch structure of the card connector of this invention in a further embodiment; and FIG. 14A and FIG. 14B are schematic views showing a conventional structure.

DETAILED DESCRIPTION OF PREFERRED EMBODIMENTS

The embodiments of this invention will be described in detail by referring to the accompanying drawings.

Figure 1:
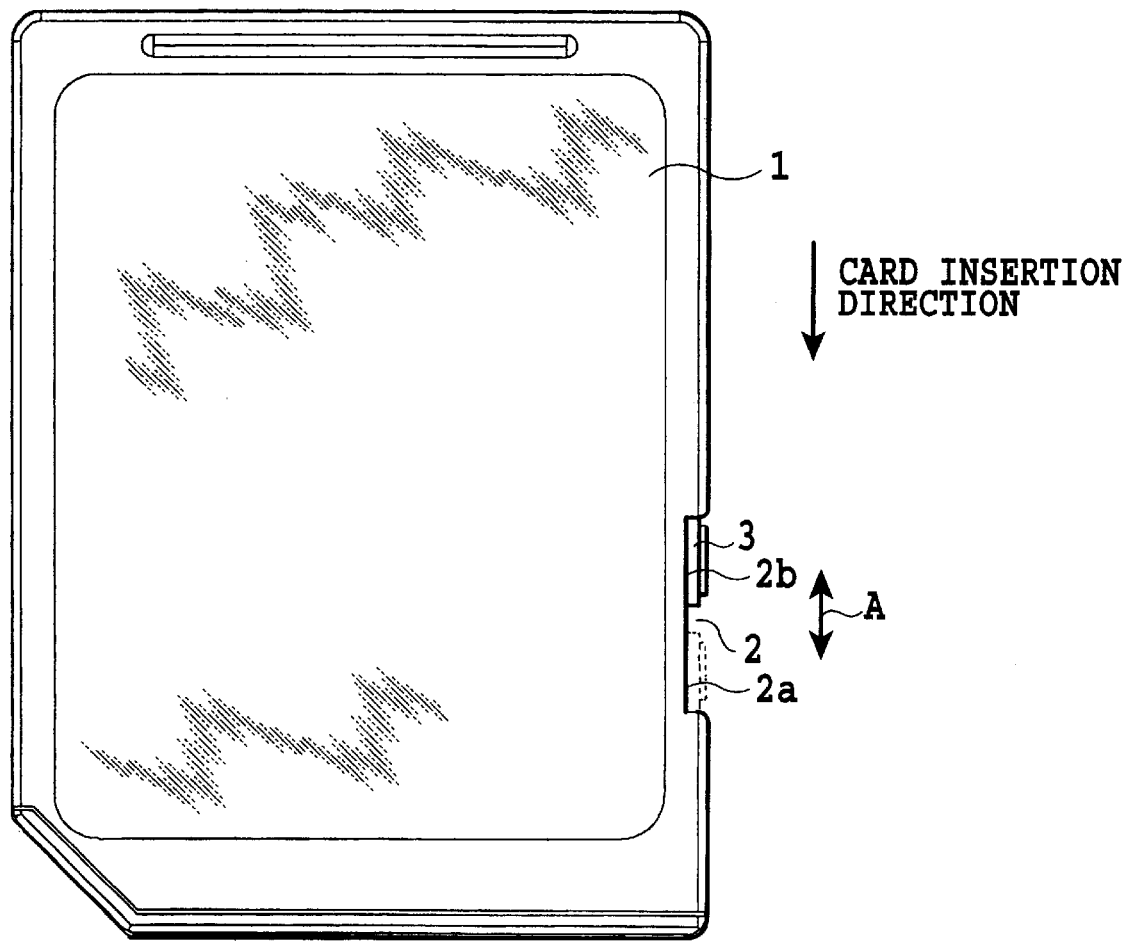
FIG. 1 is a plan view showing an IC card to be inserted into a card connector of this invention.

FIG. 1 is a plan view showing an example IC card to be loaded into the card connector of the invention.

This IC card 1 is called an SD (super density; secure digital) card.

The IC card 1 has a notch (recessed portion) 2 formed in one side thereof in which a write protect button 3 is arranged slidable in a card insertion/retraction direction (direction of arrow A). The write protect button 3 can take one of two positions, a protect-on position (write disable position) indicated by a solid line and a protect-off position indicated by a broken line, and can be slid between these two positions.

When the button 3 is set at a rear side 2b of the notch 2, the IC card 1 is write-protected. When the button 3 is set at a front side 2a of the notch 2, the card 1 is write-enabled. Although not shown in FIG. 1, a back surface of the card 1 is formed with a plurality of contact pads, including power terminals and signal terminals, that make contact with contact terminals on the connector side.

Figure 2:
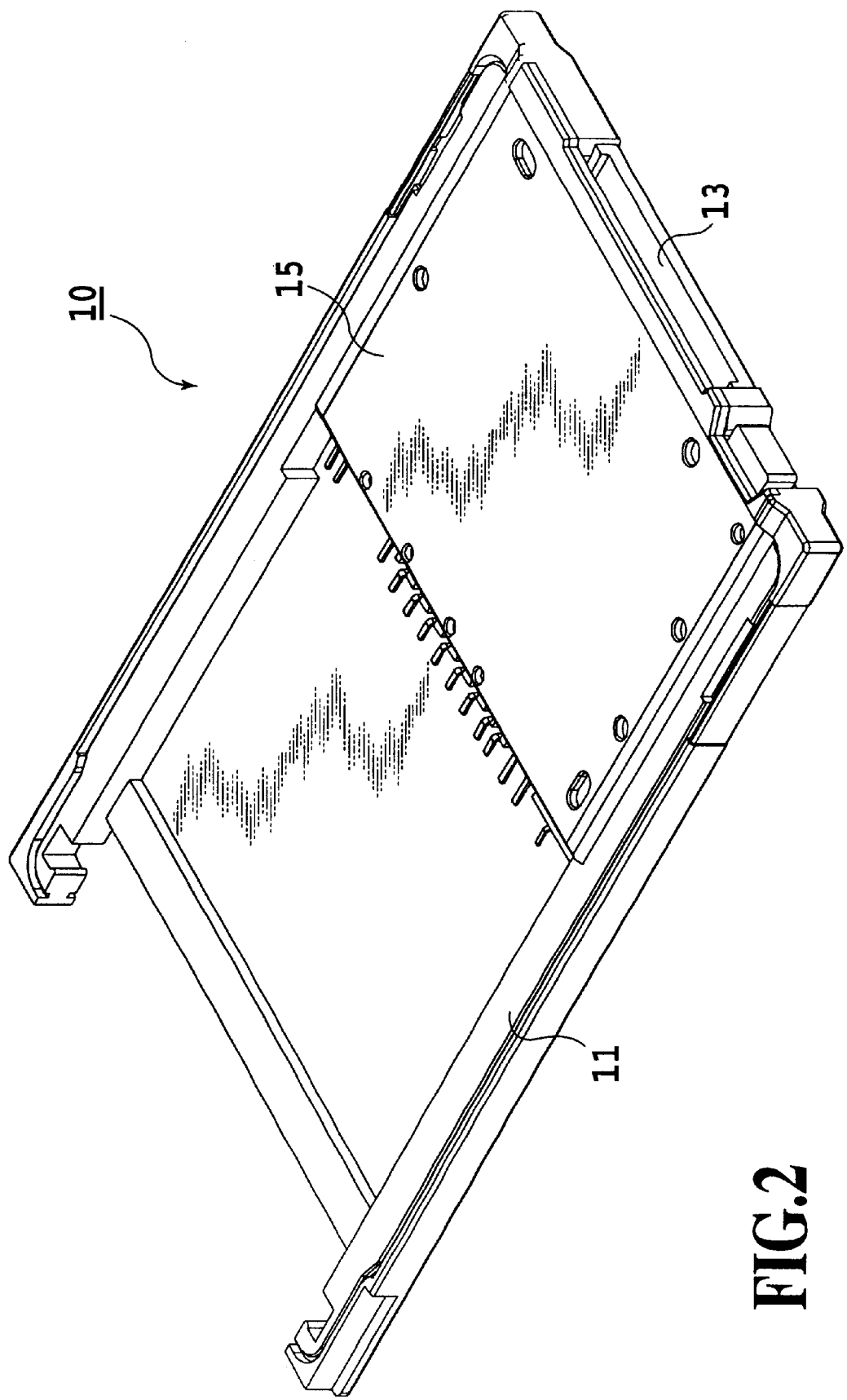
FIG. 2 is a perspective view showing an outline construction of the card connector of this invention.

FIG. 2 show a rough construction of the connector 10. A connector housing having a body 11 and a cover 15 is formed of an insulating material such as resin by molding and has a card insertion opening 13 in the front face into which the IC card 1 is inserted. Such a connector 10 is secured to an appropriate location on electronic devices such as cellular phones, telephones, PDAs, portable audio devices and cameras.

Figure 3:
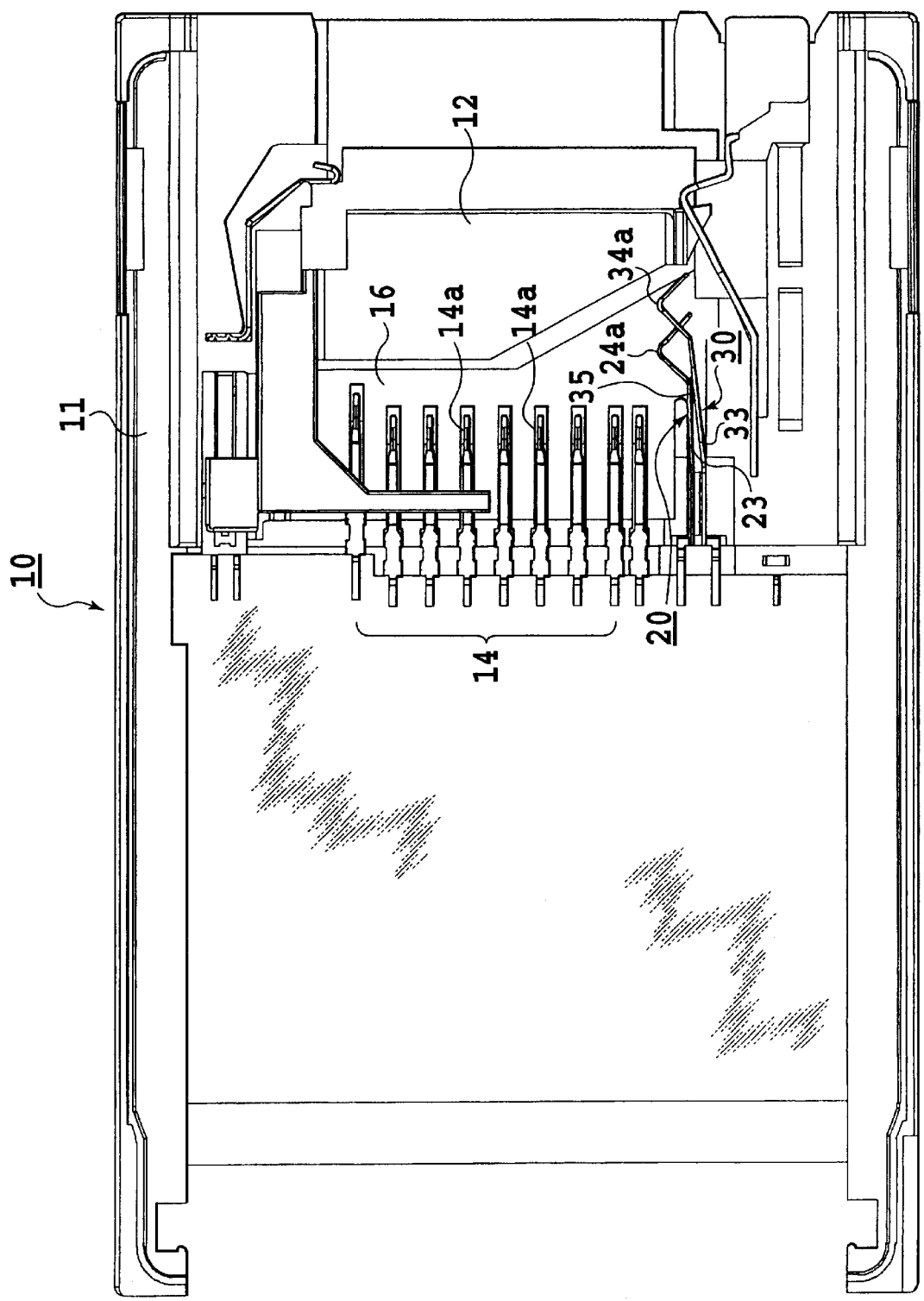
FIG. 3 is a plan view showing an internal construction of the card connector of this invention in one embodiment when the card is not inserted.
Figure 4:
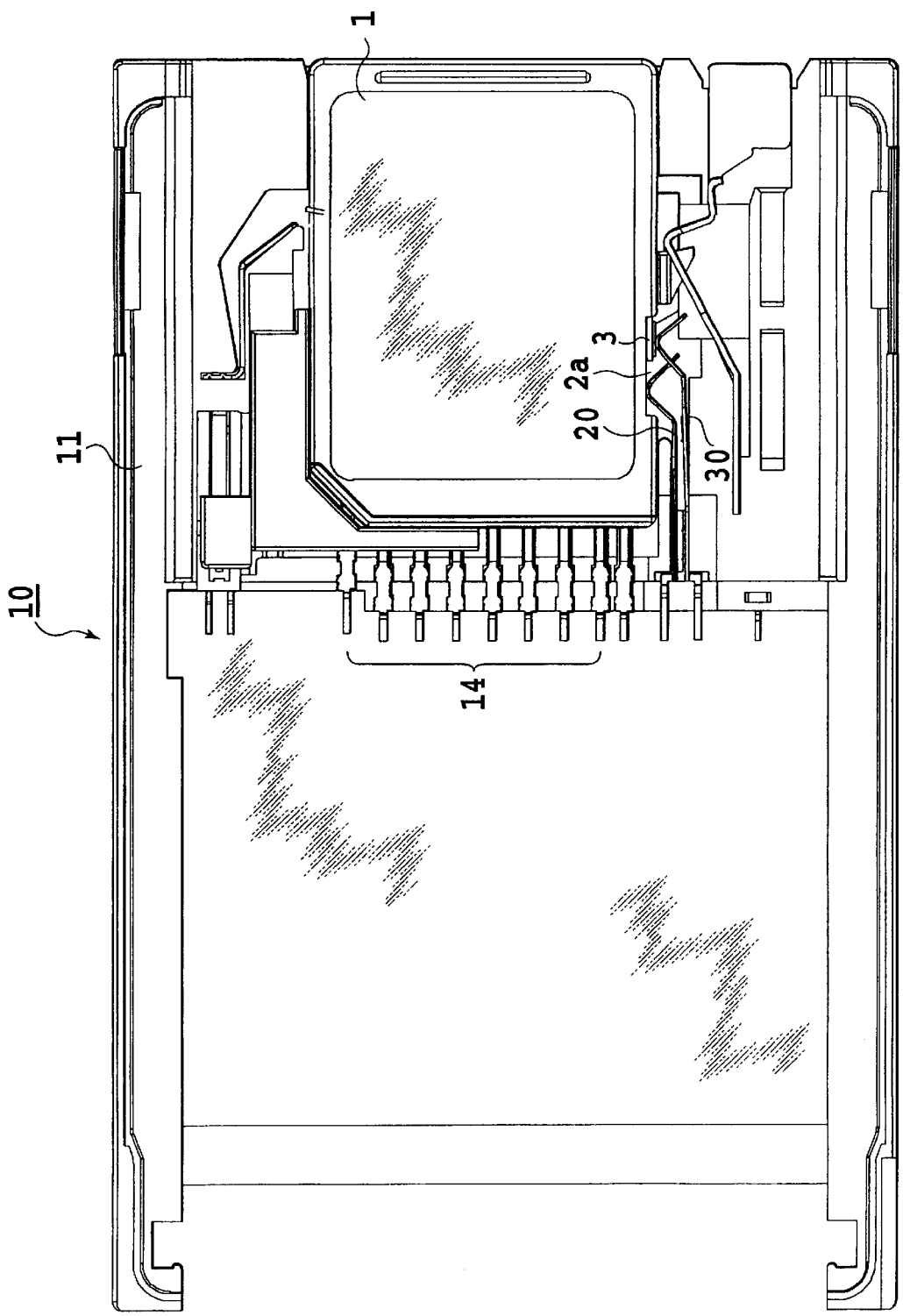
FIG. 4 is a plan view showing an internal construction of the card connector of this invention in the one embodiment when the card is inserted.

FIG. 3 and FIG. 4 are plan views showing the internal construction of the connector 10, with FIG. 3 representing the state of the connector not loaded with the card 1 and FIG. 4 representing the state of the connector loaded with the card 1. In FIG. 4 the card 1 has the write protect button 3 set at the protect-on position.

In FIG. 3 and FIG. 4, a bottom plate 16 forming a bottom surface of a card accommodating portion 12 of the housing body 11 is provided with a plurality of contacts 14 formed of cantilevered contact springs. These contacts 14 include power terminals and signal terminals. Contact portions 14a at the tips of these contacts 14 are bent upward in an arc so that they are in pressing contact with the plurality of contact pads of the inserted card 1. The base side of each contact 14 is soldered securely to a printed circuit board of the electronic device.

At the side of the card accommodating portion 12 there is a write protect switch which has two contact springs 20, 30 with their front engagement portions staggered in position. These two contact springs 20, 30 are brought into or out of contact with each other to detect the position of the write protect button 3.

Figure 5:
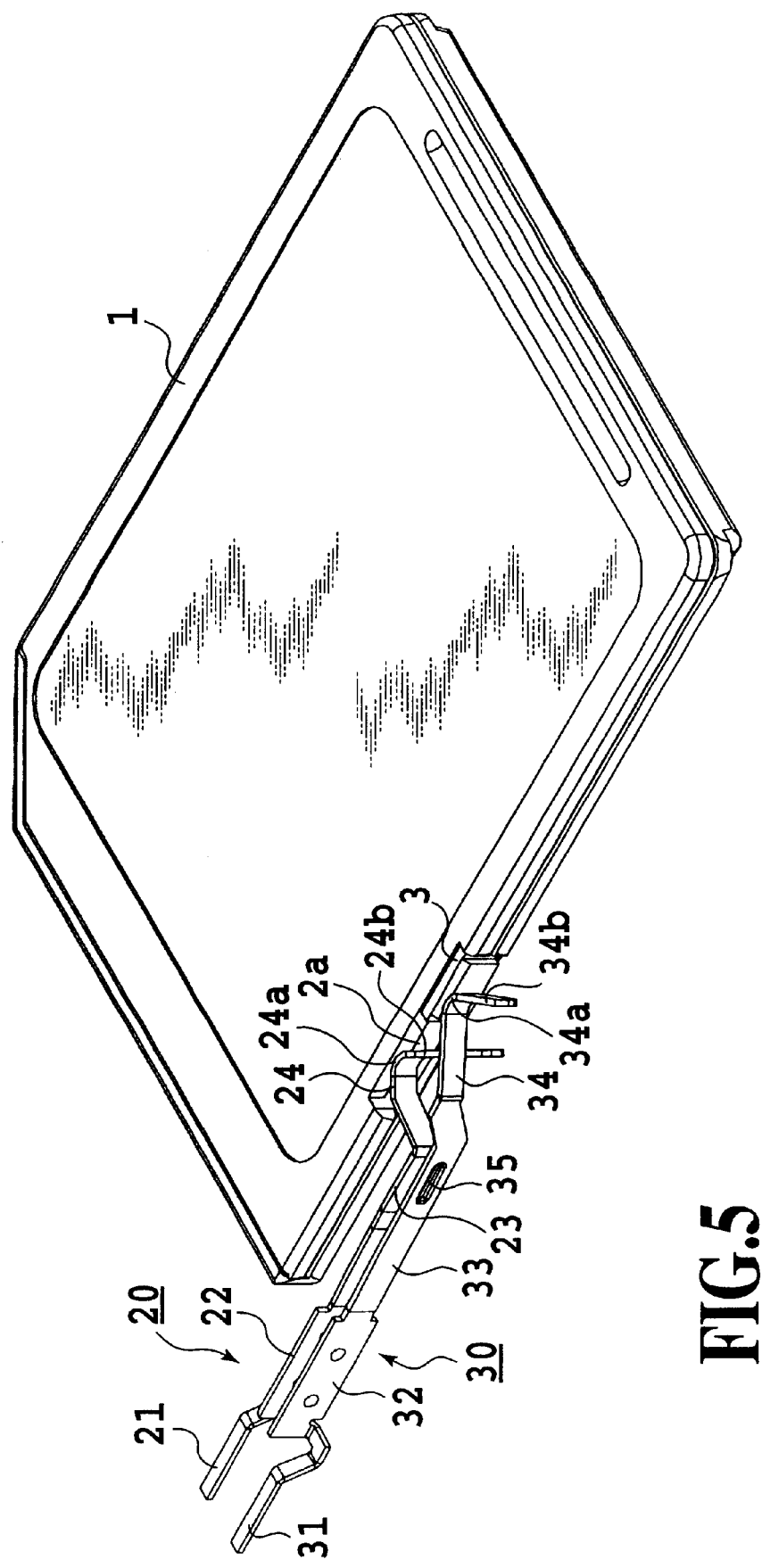
FIG. 5 is a perspective view showing a switch structure of the card connector of this invention in the one embodiment.
Figure 6:
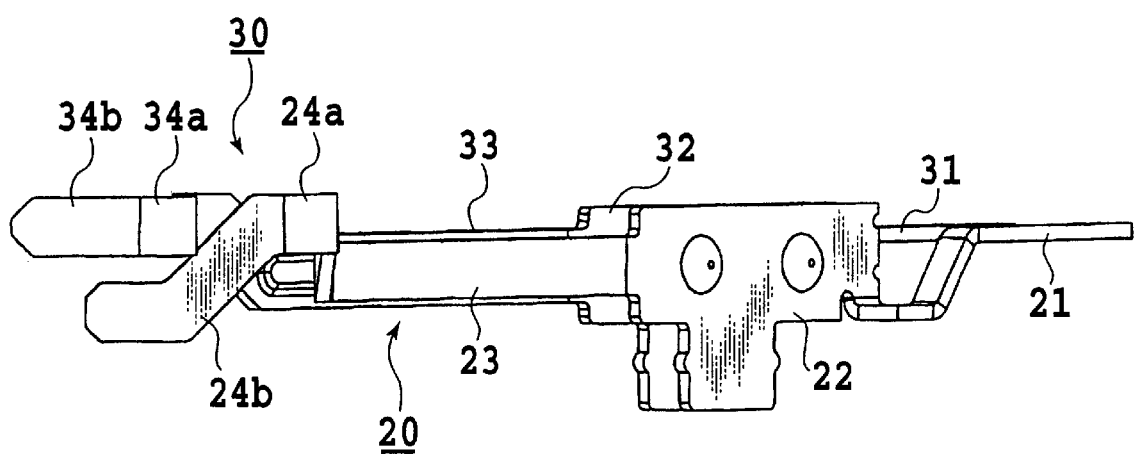
FIG. 6 is a side view showing the switch structure of the card connector of this invention in the one embodiment.

FIG. 5 and FIG. 6 shows a perspective view and a side view of these two contact springs 20, 30.

The contact spring 20, as shown in FIG. 5 and FIG. 6, is made of a metal piece having a terminal portion 21 soldered to the contact pad of the printed circuit board, a mounting portion 22 securely held to the housing body 11 with a pin or by press fit, a spring portion 23 extending along the card side surface, and a front engagement portion 24 protruding in an arc. With the mounting portion 22 rigidly held, the contact spring 20 is supported like a cantilever. The front engagement portion 24 has an engagement portion 24a and a front extending portion 24b extending forwardly from the engagement portion 24a. The engagement portion 24a engages the front side 2a of the notch 2 formed in the card 1 or the write protect button 3 slid to the front side 2a when the card 1 is inserted. When the card 1 is inserted, the contact spring 20, as shown in FIG. 3 and FIG. 4, is urged by the spring portion 23 so that the engagement portion 24a can press against the bottom surface of the front side 2a of the notch 2 in,the card 1.

The contact spring 30 is similarly formed of a metal piece having a terminal portion 31, a mounting portion 32 to hold the contact spring like a cantilever, a spring portion 33, and a front engagement portion 34 protruding in an arc. In the spring portion 33 a contact projection 35 is formed for contact with the contact spring 20. The contact projection 35 protrudes toward the contact spring 20. The front engagement portion 34 has an engagement portion 34a and a front extending portion 34b extending forwardly from the engagement portion 34a. The engagement portion 34a engages the rear side 2b of the notch 2 formed in the card 1 or the write protect button 3 slid to the rear side 2b when the IC card 1 is inserted. When the card 1 is inserted, the contact spring 30, as shown in FIG. 3 and FIG. 8, is urged by the spring portion 33 so that the engagement portion 34a can press against the bottom surface of the rear side 2b of the notch 2 in the card 1.

In this case, as shown in FIG. 6, one of the front extending portions 24b of the contact springs 20, 30 is bent downward so that the front extending portions do not contact. These front extending portions 24b, 34b have certain lengths enough to prevent the engagement portions 24a, 34b from being caught in the notch 2 of the IC card 1 and bending the contact springs 20, 30.

As shown in FIG. 3, in the card unloaded state a bending angle of the spring portion 33 of the contact spring 30 with respect to the mounting portion 32 is set larger than that of the spring portion 23 of the contact spring 20 so that the contact springs 20, 30 can easily contact each other at the contact projection 35.

Figure 7:
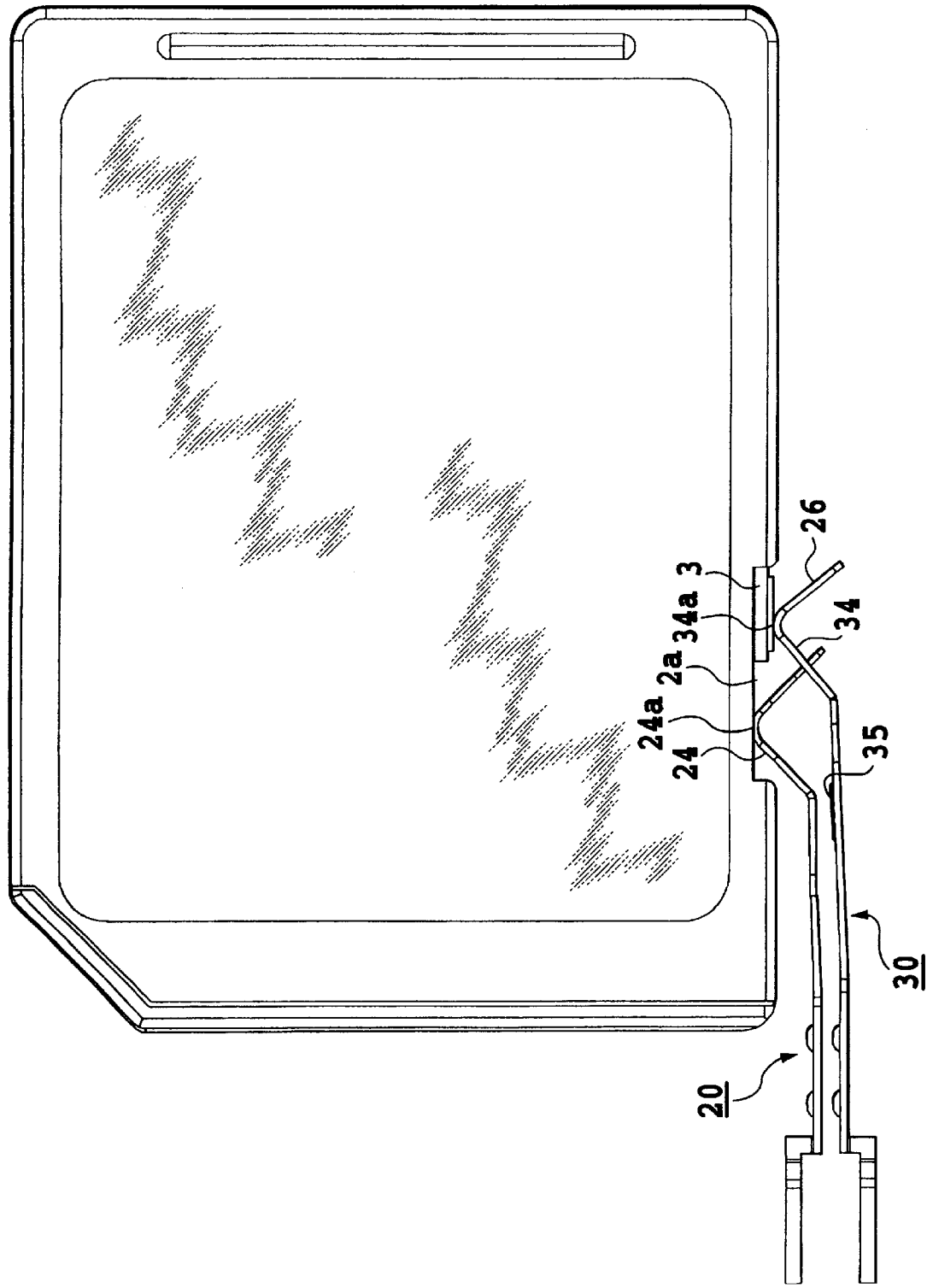
FIG. 7 is a plan view showing the switch structure of the card connector of this invention in the one embodiment when the contacts are parted.

FIG. 4, FIG. 5 and FIG. 7 show the state of the write protect switch when a card 1 with the write protect button 3 set at the write-protected position is inserted. FIG. 8 shows the state of the write protect switch when a card 1 with the write protect button 3 set at the write-enabled position is inserted.

As shown in FIG. 4, FIG. 5 and FIG. 7, in the write-protected state the engagement portion 24a of the contact spring 20 engages the bottom surface of the front side 2a of the notch 2 of the card 1 and the engagement portion 34a of the contact spring 30 engages the write protect button 3 of the card 1. At this time both of the contact springs 20, 30 are separate from each other at any portion and the write protect switch comprised of the contact springs 20, 30 is in an off state.

In the write-enabled state as shown in FIG. 8, on the other hand, the engagement portion 24a of the contact spring 20 engages the write protect button 3 situated at the front side 2a of the notch 2 of the card 1 and the engagement portion 34a of the contact spring 30 engages, the bottom surface of the rear side 2b of the notch 2 of the card 1. At this time, both of the contact springs 20, 30 are in contact with each other through the contact projection 35 of the contact spring 30 and the write protect switch comprised of the contact springs 20, 30 is in an on state.

In this switch structure, because the two contact springs 20, 30 are brought into or out of contact with each other according to the position of the write protect button 3, this contact or non-contact state is electrically detected by using an electric circuit connected to the terminal portions 21, 31 of the contact springs 20, 30 to determine whether the write protect button 3 on the IC card 1 is situated at the write-protected or write-enabled position.

In this embodiment that uses the two cantilevered contact springs 20, 30, one of the contact springs 20 urges its engagement portion 24a, when released from the write protect button 3, to elastically press against the bottom surface of the front side 2a of the recessed portion 2, which corresponds to one slide position of the button 3 on the card 1, and the other contact spring 30 urges its engagement portion 34a, when released from the button 3, to elastically press against the bottom surface of the rear side 2b of the recessed portion 2, which corresponds to the other slide position of the button 3 on the card 1.

Therefore, in this switch structure, at whichever of the two slide positions the write protect button 3 is set, the front end portion of one contact spring engages the write protect button 3 and the other contact spring engages the recessed portion 2 adjacent to the write protect button 3. Hence, even if there are plays and dimensional tolerances as described above, the contact springs 20, 30 can always be displaced by an amount equal to the height of the write protect button 3 whenever the write protect button 3 is switched in position.

In this switch structure, because the contact springs 20, 30 are brought into and out of contact with each other by using the write protect button 3 and the recessed portion 2 adjacent to the button 3, the displacement directions of the contact springs 20, 30 are opposite.

For example, let us consider a case where the switch structure changes from a state of FIG. 7 where the contact springs 20, 30 are out of contact with each other to a state of FIG. 8 where they are in contact.

Because one of the contact springs 20 moves from the state in which it presses against the front side 2a of the recessed portion 2 of the card 1 to the state where it presses against the button 3, the contact spring 20 comes closer to the contact spring 30 by a distance equal to the height of the button 3. As for the other contact spring 30, because it shifts from the state where it presses against the button 3 to the state where it presses against the rear side 2b of the recessed portion 2 of the card 1, the contact spring 30 comes closer to the contact spring 20 by a distance equal to the height of the button 3. Thus, in the transition from the state of FIG. 7 to the state of FIG. 8, both of the two contact springs 20, 30 are displaced toward each other and therefore come into contact.

The process of transition from the state of FIG. 8 where the contact springs 20, 30 are in contact to the state of FIG. 7 where they are out of contact is reverse to the process described above. In this process, the two contact springs 20, 30 are displaced away from each other and therefore parted.

In this switch structure, because the two contact springs can be moved toward and away from each other by their relative displacement corresponding to two times the height of the write protect button 3, the switch structure can advantageously be applied to small cards that cannot secure a sufficient height for the right protect button. Further, even when there are plays between the card and the connector and their dimensional tolerances, this switch structure can reliably bring the two contact springs into and out of contact with each other. Hence, this switch structure makes it possible to detect the position of the write protect button precisely and reliably, thereby preventing an erroneous operation of writing data into the write-protected card.

Figure 9A:
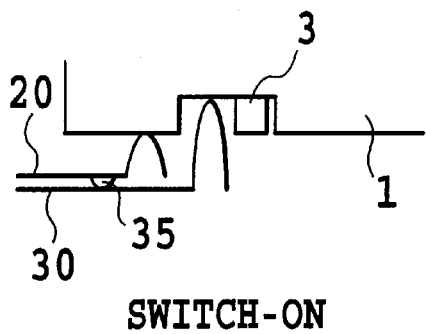
FIG. 9A and FIG. 9B are schematic views showing a switch structure of the card connector of this invention in another embodiment.

FIGS. 9A/9B to FIGS. 12A/12B show other embodiments of this invention.

Figure 9B:
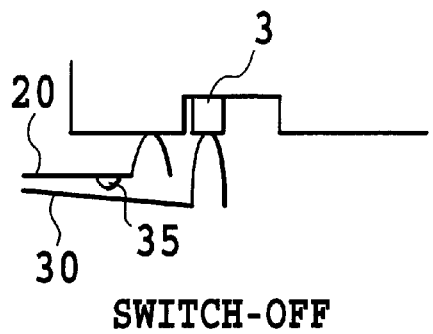

FIG. 9A illustrates a turned-on state of the write protect switch comprised of two contact springs 20, 30. In FIG. 9B, the switch is turned off.

Figure 10A:
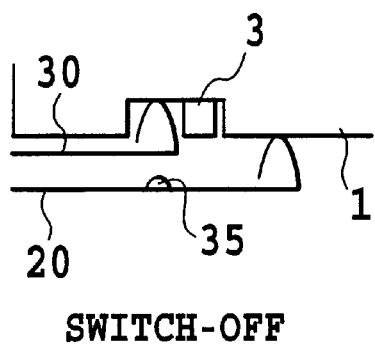
FIG. 10A and FIG. 10B are schematic views showing a switch structure of the card connector of this invention in still another embodiment.
Figure 10B:
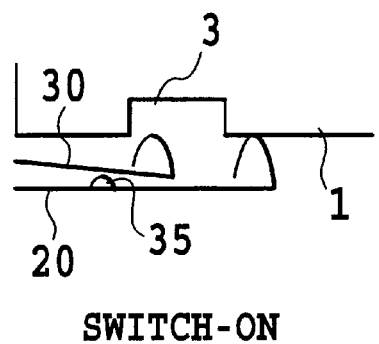

FIG. 10A shows a turned-off state of the write protect switch comprised of two contact springs 20, 30, while FIG. 10B shows the switch in an on-state.

Figure 11A:
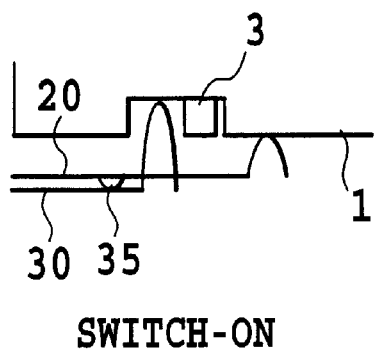
FIG. 11A and FIG. 11B are schematic views showing a switch structure of the card connector of this invention in a further embodiment.
Figure 11B:
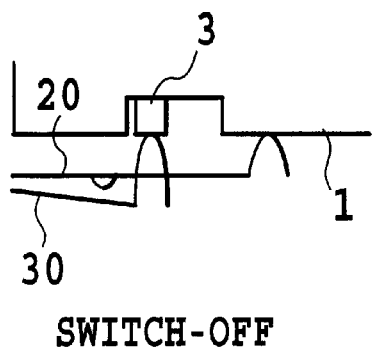

FIG. 11A shows an on-state of the write protect switch comprised of two contact springs 20, 30, while FIG. 11B shows the switch in an off-state.

FIG. 12A shows an off-state of the write protect switch comprised of two contact springs 20, 30, while FIG. 12B shows the switch in an on-state.

In these embodiments, one of the contact springs 20 is arranged and urged so that its engagement portion engages an outer side surface of the inserted card 1 near the write protect button 3, and the other contact spring 30 is arranged and urged so that its engagement portion engages the recessed portion of the inserted card 1 corresponding to one slide position of the write protect button 3.

Thus, in these switch structures, at whichever of the two slide positions the write protect button 3 is situated, the engagement portion of one of the contact springs 20 always presses against the side wall surface of the card 1 and therefore the contact spring 20 is positioned by the side wall surface of the card taken as a reference. The other contact spring 30 is always displaced by an amount equal to the height of the write protect button 3 according to the slide position of the button 3.

In these embodiments, because the two contact springs 20, 30 are brought into or out of contact with each other by taking the side surface of the card 1 as a reference, it is possible to always obtain the relative displacement between the contact springs 20 and 30 equal to the height of the write protect button 3 according to the slide position of the button 3 even when there are plays and dimensional tolerances.

FIG. 13A and FIG. 13B show a further embodiment of this invention.

In the embodiment shown in FIG. 13A and FIG. 13B, between the contact springs 20, 30 is disposed another contact piece 50, through which the contact springs 20, 30 are brought into contact with each other.

While in the above embodiments the slide position of the button indicated by a solid line in FIG. 1 represents the write-protected position and the other slide position indicated by a broken line represents the write-enabled position, they may be reversed, i.e., the button position indicated by the solid line in FIG. 1 may be made to match the write-enabled position and the broken line position the write-protected position.

In the above embodiments, the mounting portions of the contact springs 20, 30 are arranged on the front end side of the inserted card 1, as shown in FIG. 4. It is possible to reverse the direction of the contact springs 20, 30 by 180 degrees and arrange the mounting portions on the rear end side of the inserted card 1.

While in the above embodiments one of the front extending portions 24b and 34b is bent to prevent the contact springs 20, 30 from contacting each other at their front ends, it is possible to set the length of one of these front extending portions 24b so that they do not contact. The front engagement portions 24, 34 of the contact springs 20, 30 may be reduced in width and staggered in position so that they are arranged parallel and do not contact each other. Further, the front extending portion of one contact spring may be formed with a hole through which to insert the front extending portion of the other contact spring.

In the above embodiments, the switch structure having two contact springs 20, 30 is arranged on that side of the card accommodating portion 12 which corresponds to the side of the card where a write protect button is provided. When the write protect button is arranged on the front end face, front surface or back surface of the card, the arrangement position of the contact springs 20, 30 need only be changed accordingly.

Further, although in the above embodiments an SD card is used as the card 1, the present invention can be applied to any cards having a slide type write protect button.

It should also be noted that the connector housing applying this invention may use any desired shape and material.

The present invention has been described in detail with respect to various embodiments, and it will now be apparent from the foregoing to those skilled in the art that changes and modifications may be made without departing from the invention in its broader aspects, and it is the intention, therefore, in the appended claims to cover all such changes and modifications as fall within the true spirit of the invention.

What is claimed is:

1. In a card connector for removably holding a card having a write protect button, the write protect button having a predetermined height and being slidable between two positions in a recessed portion formed in an outer surface of the card; a switch structure comprising:

a first cantilevered contact spring urged so that an engagement portion of the first contact spring engages a part of the recessed portion of the inserted card corresponding to one slide position of the write protect button; and a second cantilevered contact spring extending along and in a same direction as the first contact spring and urged so that an engagement portion of the second contact spring engages a part of the recessed portion of the inserted card corresponding to the other slide position of the write protect button;

wherein the slide position of the write protect button is detected based on displacements of the first and second contact springs toward or away from each other.

2. A switch structure for a card connector as claimed in claim 1, wherein the engagement portions of the first and second contact springs protrude.

3. A switch structure for a card connector as claimed in claim 1, wherein the write protect button is arranged in the recessed portion formed in a side surface of the card.

4. In a card connector for removably holding a card having a write protect button, the write protect button having a predetermined height and being slidable between two positions in a recessed portion formed in an outer surface of the card; a switch structure comprising:

a first cantilevered contact spring urged so that an engagement portion of the first contact spring engages a part of the recessed portion of the inserted card corresponding to one slide position of the write protect button; and a second cantilevered contact spring extending along and in a same direction as the first contact spring and urged so that an engagement portion of the second contact spring engages an outer wall surface of the inserted card near the write protect button;

wherein the slide position of the write protect button is detected based on displacements of the first and second contact springs toward or away from each other.

5. A switch structure for a card connector as claimed in claim 4, wherein the write protect button is arranged in the recessed portion formed in a side surface of the card, and the second contact spring is urged so that its engagement portion engages a side wall surface of the card.

* * * * *